US008236897B2

(12) United States Patent
Comino et al.

(10) Patent No.: US 8,236,897 B2
(45) Date of Patent: Aug. 7, 2012

(54) FLUOROELASTOMER COMPOSITION

(75) Inventors: Giovanni Comino, Monza (IT); Julio A. Abusleme, Saronno (IT); Margherita Albano, Milan (IT)

(73) Assignee: Solvay Solexis S.p.A., Bollate (IT)

( * ) Notice: Subject to any disclaimer, the term of this patent is extended or adjusted under 35 U.S.C. 154(b) by 0 days.

(21) Appl. No.: 12/743,192

(22) PCT Filed: Nov. 28, 2008

(86) PCT No.: PCT/EP2008/066393
§ 371 (c)(1),
(2), (4) Date: May 14, 2010

(87) PCT Pub. No.: WO2009/068635
PCT Pub. Date: Jun. 4, 2009

(65) Prior Publication Data
US 2010/0256303 A1    Oct. 7, 2010

(30) Foreign Application Priority Data
Nov. 30, 2007   (EP) ..................... 07121980

(51) Int. Cl.
*C08L 27/00* (2006.01)
*C08L 27/04* (2006.01)
*C08L 27/06* (2006.01)
*C08L 27/12* (2006.01)
*C08L 33/14* (2006.01)
*C08G 75/02* (2006.01)

(52) U.S. Cl. ........ 525/199; 525/200; 525/213; 525/214; 524/520; 524/527; 524/544; 524/547

(58) Field of Classification Search ............... 525/199, 525/200, 213, 214; 524/520, 527, 544, 547
See application file for complete search history.

(56) References Cited

U.S. PATENT DOCUMENTS

| | | | |
|---|---|---|---|
| 3,752,787 A | 8/1973 | De Brunner | |
| 3,753,937 A | 8/1973 | Stivers | |
| 3,876,654 A | 4/1975 | Pattison | |
| 4,035,565 A | 7/1977 | Apotheker et al. | |
| 4,233,427 A | 11/1980 | Bargain et al. | |
| 4,243,770 A | 1/1981 | Tatemoto et al. | |
| 4,259,463 A | 3/1981 | Moggi et al. | |
| 4,278,776 A | 7/1981 | Mauro et al. | |
| 4,287,320 A | 9/1981 | Kolb | |
| 4,328,140 A | 5/1982 | Singletary et al. | |
| 4,394,489 A | 7/1983 | Aufdermarsh | |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Naraki et al. | |
| 5,173,553 A | 12/1992 | Albano et al. | |
| 5,446,081 A * | 8/1995 | Sonoi | ............................ 524/251 |
| 5,447,993 A | 9/1995 | Logothetis et al. | |
| 5,767,204 A | 6/1998 | Iwa et al. | |
| 5,789,509 A | 8/1998 | Schmiegel | |
| 6,310,142 B1 | 10/2001 | Apostolo et al. | |
| 6,395,834 B1 | 5/2002 | Albano et al. | |

FOREIGN PATENT DOCUMENTS

| | | |
|---|---|---|
| EP | 0099079 A1 | 1/1984 |
| EP | 0120462 A1 | 10/1984 |
| EP | 0136596 A2 | 4/1985 |
| EP | 0182299 A2 | 5/1986 |
| EP | 0199138 A2 | 10/1986 |
| EP | 0222408 A2 | 5/1987 |
| EP | 0225792 A2 | 6/1987 |
| EP | 0310966 A1 | 4/1989 |
| EP | 0335705 A1 | 10/1989 |
| EP | 0410351 A1 | 1/1991 |
| EP | 0684277 A1 | 11/1995 |
| EP | 0708797 A1 | 5/1996 |
| EP | 0769520 A1 | 4/1997 |
| EP | 0860436 A1 | 8/1998 |
| EP | 1743920 A1 | 1/2007 |
| EP | 1743921 A1 | 1/2007 |
| JP | 08-120145 | 5/1996 |
| WO | WO 94/05712 A1 | 3/1994 |
| WO | WO 97/05122 A1 | 2/1997 |

OTHER PUBLICATIONS

Standard ASTM D2240-02b, "Standard Test Method for Rubber Property—Durometer Hardness", 2002, pp. 1-12, 12 pgs.
Standard ASTM D3418-03, "Standard Test Method for Transition Temperatures of Polymers by Differential Scanning Calorimetry", Nov. 9, 2004, pp. 1-7, 8 pgs.
Standard ASTM D4440-01, "Standard Test Method for Plastics : Dynamic Mechanical Properties Melt Rheology", Apr. 4, 2006, pp. 1-4, 5 pgs.
Standard ASTM D4065-01, "Standard Practice for Plastics : Dynamic Mechanical Properties : Determination and Report of Procedures", Sep. 29, 2008, pp. 1-7, 8 pgs.

* cited by examiner

*Primary Examiner* — Nathan M Nutter
(74) *Attorney, Agent, or Firm* — Arent Fox LLP

(57) ABSTRACT

A fluoroelastomer composition comprising:
  at least one fluoroelastomer [fluoroelastomer (A)];
  from 0.1 to 25 phr (with respect to fluoroelastomer (A)) of at least one melt-processable per(halo)fluoropolymer having a melting point of at most 250° C. [polymer (F)]; and
  optionally at least one (per)fluoropolyether [(per)fluoropolyether (E)].
The incorporation of the polymer (F) in the fluoroelastomer composition as described above enables easier processing of the fluoroelastomer composition, both in injection molding and extrusion molding technologies, yielding improved behavior in mold release, mold fouling, and aspect surface of the molded parts.

13 Claims, No Drawings

FLUOROELASTOMER COMPOSITION

CROSS-REFERENCE TO RELATED APPLICATIONS

This application is a U.S. national stage application under 35 U.S.C. §371 of International Application No. PCT/EP2008/066393 filed Nov. 28, 2008, which claims priority to European Patent Application No. 07121980.2 filed Nov. 30, 2007, this application being incorporated herein by reference in its entirety for all purposes.

TECHNICAL FIELD

This invention pertains to fluoroelastomer compositions comprising particular process aid additives.

BACKGROUND ART

In order to convert fluoroelastomer raw materials and compounded gumstocks thereof into finished elastomer goods or articles with desired properties, it is common to incorporate into or mix with such fluoroelastomer gums various chemicals and compounding ingredients, each having a specific function both in the processing and vulcanization of such fluoroelastomer base materials and in the end use thereof.

One type of such ingredients is process aids, which are commonly used to modify the viscosity and toughness of the raw or unvulcanized fluoroelastomer, and/or to aid it in a specific manner, e.g. during or in the processing thereof, e.g., mixing, milling, mastication, shaping, or vulcanization of the gum or gumstock. In particular, process aids are used for assisting flow and are generally essential for easy mould release, to minimize mould fouling and to achieve a smooth surface finish notably on profiles and sheets.

Various materials have heretofore been prepared and used as process aids, such as various waxes and oils. For example, in the processing of fluoroelastomers, e.g., copolymers of vinylidene fluoride and hexafluoropropylene, which are particularly difficult to process, mixtures of oleic acid and low molecular weight polyethylene have been proposed (see U.S. Pat. No. 4,328,140 (RAYBESTOS MANHATTAN INC) 4 May 1982) as have fatty acid esters (e.g. carnauba wax and montan wax) (see U.S. Pat. No. 3,753,937 (MINNESOTA MINING & MFG)) and diorgano sulfur oxide compounds (see U.S. Pat. No. 4,287,320 (MINNESOTA MINING & MFG) 1 Sep. 1981).

Also, fluorinated oils have been suggested as process aids in fluoroelastomers composition, as taught in U.S. Pat. No. 4,278,776 (MONTEDISON S.P.A.) 14 Jul. 1981 and in EP 0099079 A (MONTEDISON S.P.A.) 25 Jan. 1984.

Although conventional process aids provide many useful benefits in the processing of fluoroelastomers, as mentioned above, the processing of these materials has presented a multitude of problems, due to the chemical nature of the fluoroelastomers and its poor compatibility with ordinary process aids and their often severe use requirements.

Oxygen-containing additives (e.g. esters), while generally compatible with the fluoroelastomer, are extractable, for example, by lubricating oils and hydraulic fluids. Resulting cured articles are thus subject to shrinkage and deformation during cure and use.

When poorly compatible additives are used (e.g. polyethylene or fluorinated oils), exudation at the flow front may cause knitting problems due to the extreme surface lubricity and undue bleeding during moulding and curing. Also, certain process aids may affect cure rate and scorch safety. In a nutshell, traditional process aids do not perform as well as desired, some of these interfere with the curing of the gum, and others adversely affect the final physical and mechanical properties, shape, and visual appearance of the cured fluoroelastomer or finished goods.

Process aids for fluoroelastomer compositions, easy to incorporate, enabling outstanding mould release with virtually no mould fouling in injection/extrusion moulding, and/or enabling easy extrusion with outstanding surface aspect with substantially no die bleed, while having no adverse affect on the curing of the fluoroelastomer or on other desired properties of the fluoroelastomer compositions or finished goods therefrom are thus still considered a current shortfall in the art.

DISCLOSURE OF INVENTION

It is thus an object of the invention a fluoroelastomer composition comprising:
- at least one fluoroelastomer [fluoroelastomer (A)];
- from 0.1 to 25 phr (with respect to fluoroelastomer (A)) of at least one melt-processable per(halo)fluoropolymer having a melting point of at most 250° C. [polymer (F)];
- optionally at least one (per)fluoropolyether [(per)fluoropolyether (E)].

The Applicant has surprisingly found that the incorporation in the fluoroelastomer composition of the polymer (F) as above described enables easier processing of the fluoroelastomer composition, both in injection moulding and extrusion moulding technologies, yielding improved behaviour in mould release, mould fouling and aspect surface of the moulded parts.

For the purposes of this invention, the term "fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, fluorinated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable fluorinated monomers are notably:
- $C_2$-$C_8$ fluoro- and/or perfluoroolefins, such as tetrafluoroethylene (TFE), hexafluoropropene (HFP), pentafluoropropylene, and hexafluoroisobutylene;
- $C_2$-$C_8$ hydrogenated monofluoroolefins, such as vinyl fluoride;
- 1,2-difluoroethylene, vinylidene fluoride (VDF) and trifluoroethylene (TrFE);
- (per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
- chloro- and/or bromo- and/or iodo-$C_2$-$C_6$ fluoroolefins, like chlorotrifluoroethylene (CTFE);
- fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;
- hydrofluoroalkylvinylethers complying with formula $CH_2=CFOR_{f1}$ in which $R_{f1}$ is a $C_1$-$C_6$ fluoro- or perfluoroalkyl, e.g. $-CF_3$, $-C_2F_5$, $-C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;

functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

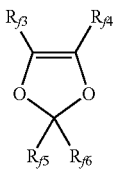

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2OF_2OCF_3$.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:
(1) VDF-based copolymers, in which VDF is copolymerized with at least one comonomer chosen from the followings classes:
(a) $C_2$-$C_8$ perfluoroolefins, such as tetrafluoroethylene (TFE), hexafluoropropylene (HFP), hexafluoroisobutylene;
(b) hydrogen-containing $C_2$-$C_8$ olefins, such as vinyl fluoride (VF), trifluoroethylene (TrFE), perfluoroalkyl ethylenes of formula $CH_2=CH-R_f$, wherein $R_f$ is a $C_1$-$C_6$ perfluoroalkyl group;
(c) $C_2$-$C_8$ chloro and/or bromo and/or iodo-fluoroolefins such as chlorotrifluoroethylene (CTFE);
(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;
(f) (per)fluorodioxoles having formula:

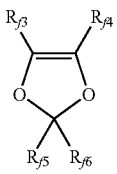

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;

(g) (per)fluoro-methoxy-vinylethers (MOVE, hereinafter) having formula:

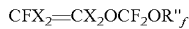

$$CFX_2=CX_2OCF_2OR''_f$$

wherein $R''_f$ is selected among $C_1$-$C_6$ (per)fluoroalkyls, linear or branched;
$C_5$-$C_6$ cyclic (per)fluoroalkyls; and $C_2$-$C_6$ (per)fluorooxyalkyls, linear or branched, comprising from 1 to 3 catenary oxygen atoms, and $X_2=F$, H; preferably $X_2$ is F and $R''_f$ is $-CF_2CF_3$ (MOVE1); $-CF_2CF_2OCF_3$ (MOVE2); or $-CF_3$ (MOVE3);
(h) $C_2$-$C_8$ non-fluorinated olefins (OI), for example ethylene and propylene; and
(2) TFE-based copolymers, in which TFE is copolymerized with at least one comonomer chosen from classes (c), (d), (e), (g), (h) as above detailed and the followings:
(i) perfluorovinyl ethers containing cyanide groups, such as notably those described in U.S. Pat. No. 4,281,092, U.S. Pat. No. 5,447,993 and U.S. Pat. No. 5,789,489.

Most preferred fluoroelastomers (A) are those having following compositions (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;
(ii) vinylidene fluoride (VDF) 50-80%, perfluoroalkyl vinyl ethers (PAVE) 5-50%, tetrafluoroethylene (TFE) 0-20%;
(iii) vinylidene fluoride (VDF) 20-30%, $C_2$-$C_8$ non-fluorinated olefins (OI) 10-30%, hexafluoropropene (HFP) and/or perfluoroalkyl vinyl ethers (PAVE) 18-27%, tetrafluoroethylene (TFE) 10-30%;
(iv) tetrafluoroethylene (TFE) 50-80%, perfluoroalkyl vinyl ethers (PAVE) 20-50%;
(v) tetrafluoroethylene (TFE) 45-65%, $C_2$-$C_8$ non-fluorinated olefins (OI) 20-55%, vinylidene fluoride 0-30%;
(vi) tetrafluoroethylene (TFE) 32-60% mol %, $C_2$-$C_8$ non-fluorinated olefins (OI) 10-40%, perfluoroalkyl vinyl ethers (PAVE) 20-40%, fluorovinyl ethers (MOVE) 0-30%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%;
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%;
(ix) tetrafluoroethylene (TFE) 20-70%, fluorovinyl ethers (MOVE) 30-80%, perfluoroalkyl vinyl ethers (PAVE) 0-50%.

Optionally, fluoroelastomer (A) of the present invention also comprise recurring units derived from a bis-olefin having general formula:

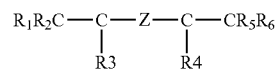

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in patent EP 661 304 in the name of the Applicant.

The fluoroelastomer (A) can be prepared by any known method, such as emulsion or micro-emulsion polymerization, suspension or micro-suspension polymerization, bulk polymerization and solution polymerization.

Polymerization is usually carried out at a temperature between 25 and 150° C., under a pressure of up to 10 MPa.

The fluoroelastomer (A) is preferably prepared by emulsion polymerization, in the presence of a radical generator. Suitable radical generators are notably the alkaline persulphates, perborates and percarbonates. It is also possible to employ a combination of peroxy generators with reducers, such as sulphites, bisulphites, metabisulphites, thiosulphates, phosphites or hyposulphites of alkaline metals or of ammonium, or copper (I) salts, Fe (II) salts, silver salts and other easily oxidizable metal salts. It is possible to use also organic radical generators, e.g. organic peroxides.

Suitable organic peroxides useful as radical generators can be selected in particular from:
(a) dialkylperoxides, wherein alkyl has from 1 to 12 carbon atoms, for instance diterbutylperoxide (DTBP);
(b) dialkylperoxydicarbonates, wherein the alkyl has from 1 to 12 carbon atoms, for instance diisopropylperoxydicarbonate:
(c) diacylperoxides, wherein acyl has from 2 to 12 carbon atoms, for instance diacetylperoxide;
(d) peroxyesters having from 3 to 20 carbon atoms, for instance terbutylperoxyisobutyrate.

For the purpose of the invention, the term "per(halo)fluoropolymer" is intended to denote a fluoropolymer substantially free of hydrogen atoms.

The term "substantially free of hydrogen atom" is understood to mean that the per(halo)fluoropolymer consists essentially of recurring units derived from ethylenically unsaturated monomers comprising at least one fluorine atom and free of hydrogen atoms [per(halo)fluoromonomer (PFM)].

The per(halo)fluoropolymer is melt-processable.

For the purposes of the present invention, by the term "melt-processable" is meant that the per(halo)fluoropolymer can be processed (i.e. fabricated into shaped articles such as films, fibers, tubes, wire coatings and the like) by conventional melt extruding, injecting or casting means.

It is essential that the melting point of the polymer (F) is of at most 250° C.

The Applicant has found that when the melting point of the polymer (F) exceeds 250° C., the addition of polymer (F) in the inventive composition does not provide for improved processing behaviour neither in injection moulding nor in extrusion moulding.

The Applicant thinks, without this limiting the scope of the invention, that when the polymer (F) has a melting point as above defined, softening and/or incipient melting of this polymer (F) can take place within the fluoroelastomer matrix during processing of the same, so that mould release is improved and mould fouling substantially avoided.

The melting point of polymer (F) ($T_{m2}$) is determined by Differential Scanning Calorimetry (DSC) at a heating rate of 10° C./min, according to ASTM D 3418 Standard.

Polymer (F) has a melting point of preferably at most 240° C., more preferably at most 230° C., even more preferably at most 225° C.

The polymer (F) of the invention has advantageously a dynamic viscosity at a shear rate of 1 rad×sec$^{-1}$ of less than 2000 Pa×sec, preferably of less than 700 Pa×sec, more preferably of less than 500 Pa×sec, most preferably of less than 50 Pa×sec, at a temperature of 280° C.

Dynamic viscosity is advantageously determined according to ASTM D 4440 standard, following equations listed in Practice ASTM D 4065 to determine "Complex viscosity, $\eta^*$" at 1 rad×sec$^{-1}$.

Dynamic viscosity is typically measured with a controlled strain rheometer, employing an actuator to apply a deforming strain to the sample and a separate transducer to measure the resultant stress developed within the sample, using the parallel plate fixture.

The per(halo)fluoropolymer of the invention is preferably a tetrafluoroethylene (TFE) copolymer.

The term tetrafluoroethylene (TFE) copolymer is intended to encompass per(halo)fluoropolymers comprising recurring units derived from TFE and from at least one other per(halo) fluoromonomer (PFM) as above described different from TFE.

The polymer (F) of the invention is more preferably a TFE copolymer comprising advantageously at least 0.5% by moles, preferably at least 5% by moles, more preferably at least 7% by moles of recurring units derived from the per (halo)fluoromonomer (PFM) different from TFE, with respect to the total moles of recurring units.

The polymer (F) of the invention is more preferably a TFE copolymer comprising advantageously at most 30% by moles, preferably at most 25% by moles, more preferably at most 23% by moles of recurring units derived from the per (halo)fluoromonomer (PFM) different from TFE, with respect to the total moles of recurring units.

Per(halo)fluoromonomers (PFM) different from TFE are notably chosen among:
$C_3$-$C_8$ perfluoroolefins, such as hexafluoropropene (HFP); chloro- and/or bromo- and/or iodo-$C_2$-$C_6$ per(halo)fluoroolefins, like chlorotrifluoroethylene (CTFE);
per(halo)fluoroalkylvinylethers complying with general formula $CF_2=CFOR_{f3}$ in which $R_{f3}$ is a $C_1$-$C_6$ per(halo) fluoroalkyl, such as —$CF_3$, —$C_2F_5$, —$C_3F_7$;
per(halo)fluoro-oxyalkylvinylethers complying with general formula $CF_2=CFOX_{01}$, in which $X_{01}$ is a $C_1$-$C_{12}$ per(halo)fluorooxyalkyl having one or more ether groups, like perfluoro-2-propoxy-propyl group;
per(halo)fluoro-methoxy-alkylvinylethers complying with general formula $CF_2=CFOCF_2OR_{f4}$ in which $R_{f4}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$;
per(halo)fluorodioxoles of formula:

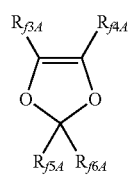

wherein each of $R_{f3A}$, $R_{f4A}$, $R_{f5A}$, $R_{f6A}$, equal of different each other, is independently a fluorine atom, a $C_1$-$C_6$ perfluoroalkyl group, optionally comprising one or more oxygen atoms, e.g. —$CF_3$, —$C_2F_5$, —$C_3F_7$, —$OCF_3$, —$OCF_2CF_2OCF_3$.

Even more preferred polymers (F) are TFE copolymers comprising recurring units derived from at least one per(halo) fluoromonomer (PFM) chosen among the group consisting of:

1. perfluoroalkylvinylethers complying with formula $CF_2=CFOR_{f1'}$, in which $R_{f1'}$ is a $C_1$-$C_6$ perfluoroalkyl, e.g. —$CF_3$, —$C_2F_5$, —$C_3F_7$; and/or
2. perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl; and/or
3. $C_3$-$C_8$ perfluoroolefins, such as hexafluoropropylene.
4. per(halo)fluorodioxoles of formula:

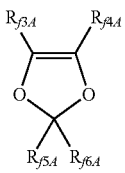

wherein each of $R_{f3A}$, $R_{f4A}$, $R_{f5A}$, $R_{f6A}$, equal of different each other, is independently a fluorine atom, a $C_1$-$C_6$ perfluoroalkyl group, optionally comprising one or more oxygen atoms, e.g. —$CF_3$, —$C_2F_5$, —$C_3F_7$, —$OCF_3$, —$OCF_2CF_2OCF_3$, preferably a per(halo)fluorodioxole as above described, wherein $R_{f3A}$ and $R_{f4A}$ are fluorine atoms and $R_{f5A}$ and $R_{f6A}$ are perfluoromethyl groups (—$CF_3$) [perfluoro-2,2-dimethyl-1,3-dioxole (PDD)], or wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1,3-dioxole or perfluoromethoxydioxole (MDO)].

Even more preferred polymers (F) are TFE copolymers comprising recurring units derived from at least one perfluoroalkylvinylether (PAVE) complying with formula $CF_2=CFOR_{f1'}$, in which $R_{f1'}$ is a $C_1$-$C_6$ perfluoroalkyl (TFE/PAVE copolymers, herein below).

The expression "at least one perfluoroalkylvinylether" is understood to mean that the TFE/PAVE copolymer can comprise recurring units derived from one or more than one perfluoroalkylvinylether as above described.

As used herein, the term perfluoroalkylvinylether is understood, for the purposes of the present invention, both in the plural and the singular.

Good results have been obtained with TFE/PAVE copolymers comprising recurring units derived from at least one perfluoroalkylvinylether complying with formula $CF_2=CFOR_{f7'}$, in $R_{f7'}$ is a group chosen among —$CF_3$, —$C_2F_5$, —$C_3F_7$.

Excellent results have been obtained with TFE/PAVE copolymers comprising recurring units derived from perfluoromethylvinylether (of formula $CF_2=CFOCF_3$) (MVE, hereinafter).

TFE/PAVE copolymers may also comprise recurring units derived from at least one per(halo)fluoromonomer different from TFE and perfluoroalkylvinylether as above described. In particular, TFE/PAVE copolymers may comprise recurring units derived from perfluoro-oxyalkylvinylethers as above described, and/or $C_3$-$C_8$ perfluoroolefins as above described (e.g. hexafluoropropylene), and/or per(halo)fluorodioxoles as above described.

According to the most preferred embodiment of the invention, the polymer (F) is advantageously chosen among TFE/PAVE copolymers consisting essentially of recurring units derived from TFE and at least one perfluoroalkylvinylether as above detailed.

It is understood that the TFE/PAVE copolymers of this most preferred embodiment can comprises other moieties, such as end-groups, defects and the like, which do not substantially affect the properties of said materials.

According to this most preferred embodiment of the invention, polymer (F) is preferably a copolymer consisting essentially of recurring units derived from TFE and from MVE.

The polymer (F) according to this embodiment is more preferably a TFE/MVE copolymer consisting essentially of:
from 3 to 25% by moles, preferably from 5 to 20% by moles, more preferably from 8 to 18% by moles, even more preferably from 10 to 15% by moles of recurring units derived from MVE; and
from 97 to 75% by moles, preferably from 95 to 80% by moles, more preferably from 92 to 82% by moles, even more preferably from 90 to 85% by moles of recurring units derived from TFE.

The composition of the invention comprises the polymer (F) in an amount of at least 0.1 phr, preferably at least 0.2 phr, more preferably at least 0.3 phr, most preferably at least 0.5 phr (with respect to fluoroelastomer (A)).

The composition of the invention comprises the polymer (F) in an amount of at most 25 phr, preferably at most 20 phr, more preferably at most 15 phr (with respect to fluoroelastomer (A)).

Good results have been obtained with fluoroelastomer compositions comprising from 0.3 to 15 phr of polymer (F). Best results have been achieved with fluoroelastomer compositions comprising from 1 to 15 phr of polymer (F).

According to a preferred embodiment of the invention, the composition also comprises at least one (per)fluoropolyether [(per)fluoropolyether (E)].

The Applicant has surprisingly found that the combination of the polymer (F) as above described with the (per)fluoropolyether (E) synergistically cooperate in improving processing properties of fluoroelastomer (A), showing excellent mould release properties, substantial absence of mould fouling and die bleed.

Also, polymer (F) can be advantageously used for vehiculating (per)fluoropolyether (E) in the fluoroelastomer (A) matrix, so that better efficiency of (per)fluoropolyether (E) is obtained.

Within the context of the present invention, the term (per)fluoropolyether (E) is intended to denote a polymer comprising recurring units (R1), said recurring units comprising at least one ether linkage in the main chain and at least one fluorine atom (fluoropolyoxyalkene chain).

Preferably the recurring units R1 of the (per)fluoropolyether (E) are selected from the group consisting of:
(I) —CFX—O—, wherein X is —F or —$CF_3$; and
(II) —$CF_2$—CFX—O—, wherein X is —F or —$CF_3$; and
(III) —$CF_2$—$CF_2$—$CF_2$—O—; and
(IV) —$CF_2$—$CF_2$—$CF_2$—$CF_2$—O—; and
(V) —$(CF_2)_j$—CFZ—O— wherein j is an integer chosen from 0 and 1 and Z is a fluoropolyoxyalkene chain comprising from 1 to 10 recurring units chosen among the classes (I) to (IV) here above;
and mixtures thereof.

Should the (per)fluoropolyether (E) comprise recurring units R1 of different types, advantageously said recurring units are generally randomly distributed along the fluoropolyoxyalkene chain.

Preferably the (per)fluoropolyether is a compound complying with formula (I) here below:

$$T_1\text{-}(CFX)_p\text{—O—}R_f\text{—}(CFX)_{p'}\text{-}T_2 \qquad (I)$$

wherein:
each of X is independently F or $CF_3$;
p and p', equal or different each other, are integers from 0 to 3;
$R_f$ is a fluoropolyoxyalkene chain comprising repeating units R°, said repeating units being chosen among the group consisting of:
(i) —CFXO—, wherein X is F or $CF_3$,
(ii) —$CF_2$CFXO—, wherein X is F or $CF_3$,
(iii) —$CF_2CF_2CF_2O$—,
(iv) —$CF_2CF_2CF_2CF_2O$—,
(v) —$(CF_2)_j$—CFZ—O— wherein j is an integer chosen from 0 and 1 and Z is a group of general formula —$OR_f'T_3$, wherein $R_f'$ is a fluoropolyoxyalkene chain comprising a number of repeating units from 0 to 10, said recurring units being chosen among the followings: —CFXO—, —$CF_2$CFXO—, —$CF_2CF_2CF_2O$—, —$CF_2CF_2CF_2CF_2O$—, with each of each of X being independently F or $CF_3$; and $T_3$ is a $C_1$-$C_3$ perfluoroalkyl group, and mixtures thereof;
$T_1$ and $T_2$, the same or different each other, are H, halogen atoms, $C_1$-$C_{30}$ end-group optionally comprising heteroatoms chosen among O, S, N, and/or halogen atoms.

The number averaged molecular weight of the (per)fluoropolyether (E) is generally comprised between 400 and 100 000, preferably between 600 and 20 000.

More preferably, the (per)fluoropolyether (E) is selected among the group consisting of:
(a) HO—$CH_2CF_2O(CF_2O)_n(CF_2CF_2O)_mCF_2CH_2$—OH, m' and n' being integers, where the ratio m'/n' generally ranges between 0.1 and 10, preferably between 0.2 and 5;
(b) $HO(CH_2CH_2O)_nCH_2CF_2O(CF_2O)_n(CF_2CF_2O)_m$ $CF_2CH_2(OCH_2CH_2)_nOH$, m' and n' being integers, where the ratio m'/n' generally ranges between 0.1 and 10, preferably between 0.2 and 5, and n ranges between 1 and 3;
(c) $HCF_2O(CF_2O)_n(CF_2CF_2O)_mCF_2H$, m' and n' being integers, where the ratio m'/n' generally ranges between 0.1 and 10, preferably between 0.2 and 5;
(d) $FCF_2O(CF_2O)_n(CF_2CF_2O)_mCF_2F$, m' and n' being integers, where the ratio m'/n' generally ranges between 0.1 and 10, preferably between 0.2 and 5.

Excellent results have been obtained with fluoroelastomer compositions comprising a (per)fluoropolyether (E) chosen among types (a) and (b) here above.

The (per)fluoropolyethers (E) of types (a), (b), (c), and (d) as above described, are notably available from Solvay Solexis S.p.A. as FOMBLIN® Z-DOL, FOMBLIN® Z-DOL TX, H-GALDEN® and FOMBLIN® Z or FOMBLIN® M.

Should the composition of the invention comprise the (per)fluoropolyether (E), its amount is of preferably at least 0.02 phr, more preferably at least 0.05 phr and preferably at most 15 phr, more preferably at most 10 phr, even more preferably at most 5 phr (with respect to fluoroelastomer (A)).

In particular, while a certain amount, as above described, can produce a synergistic effect in combination with the per (halo)fluoropolymer (F), amounts exceeding limits as above detailed might impair compression set and are thus not preferred. Nevertheless, higher amount might be suitable for applications wherein compression set is not an issue.

Good results have been obtained with compositions comprising from 0.02 to 7 phr of (per)fluoropolyether (E).

Excellent results have been obtained with composition comprising from 0.05 to 1 phr of (per)fluoropolyether (E).

Optionally the fluoroelastomer composition of the invention may comprise other conventional additives, such as fillers, thickeners, pigments, antioxidants, stabilizers and the like.

In particular, the fluoroelastomer composition of the invention can further comprise an additional semicrystalline (per)fluoropolymer [polymer (T)] different from polymer (F), in an amount generally from 0 to 70 phr, preferably from 2 to 40 phr with respect to the fluoroelastomer (A). Preferably, polymer (T) is chosen among:
te-tra-fluoro-ethylene (TF-E) homopolymer and TFE copolymers with one or more monomers comprising at least one unsaturation of ethylene type, in an amount from 0.01% to 10% by moles, preferably from 0.05% to 7% by moles, said TFE homopolymer and copolymers having a melting point higher than 250° C.;
vinylidene fluoride (VDF) homopolymer and VDF copolymers with one or more monomers comprising at least one unsaturation of ethylene type, in an amount from 0.01% to 30% by moles.

Said comonomers having an ethylene unsaturation are of hydrogenated and fluorinated type. Among the hydrogenated ones, ethyle-ne, propy-lene, acrylic monomers, for example me-t-hyl-methacrylate, (meth)a-crylic acid, butylacryla-te, hydro-xyethylhexylacrylate, styrene monomers, can be mentioned. Among fluorinated comonomers, mention can be made of fluorinated monomers of classes (a) to (g) as herein above detailed as comonomers for fluoroelastomers (A).

The invention also pertains to a process for the manufacture of the fluoroelastomer composition as above described.

The process of the invention advantageously comprises incorporating into the fluoroelastomer (A) the required amount of polymer (F), and optionally of (per)fluoropolyether (E).

Such aids, as well as other chemicals or compounding ingredients, are usually incorporated into the fluoroelastomer (A) with a mill or an internal mixer (such as a Banbury mixer).

The compounded fluoroelastomer composition can then be fabricated by moulding (injection moulding, extrusion moulding), calendering, or extrusion into the desired shaped article, which is advantageously subjected to vulcanization (curing) during the processing itself and/or in a subsequent step (post-treatment or post-cure), advantageously transforming the relatively soft, weak, fluoroelastomer composition into a finished article made of non-tacky, strong, insoluble, chemically and thermally resistant cured fluoroelastomer composition.

When the composition of the invention further comprises the (per)fluoropolyether (E), it is generally preferred first mixing the polymer (F) and the (per)fluoroether (E) so as to obtain a process aid mixture [mixture (M)], and then incorporating said mixture (M) into the fluoroelastomer (A).

The polymer (F) and the (per)fluoropolyether (E) can be mixed by standard techniques, well-known to those skilled in the art.

Generally polymer (F) is used under the form of powder, for increasing efficiency in mixing.

Polymer (F) can be solid mixed with (per)fluoropolyether (E) or melt compounded with the same.

Solid mixing can be notably carried out in tumbler mixers, screw mixers, paddles mixers, pneumatic mixers and the like.

Preferably, the polymer (F) and the (per)fluoropolyether (E) are admixed by melt compounding to obtain a molten mixture (M). Typical melt blending devices can be used, such as notably kneaders, Banbury-type mixers, static mixers, single screw and double screw extruders, Braebender® mixers and other high intensity mixers.

The molten mixture (M) is advantageously cooled so as to obtain solid mixture (M), generally under the form of pellets or slabs.

Solid mixture (M) is advantageously milled or ground so as to obtain a powdery mixture (M) comprising polymer (F) and (per)fluoropolyether (E).

Standard milling devices can be used, such as notably ball mills, disk pulverizers, rotor mills, cutting mills, cross beater mills. An apparatus which has been found particularly useful is a variable speed rotor mill, e.g. commercialized as Fritsch Pulverisette 14.

As powdery mixture (M) it is understood to mean that the mixture (M) is under the form of finely dispersed solid particles, having advantageously free-flowing properties.

Particles of the powdery mixture (M) have advantageously a particle size of less than 1 000 µm for at least 50% weight.

The particles of the powdery mixture (M) have a size of less than 1 000 µm for at least preferably 80% wt, more preferably 90% wt.

The powdery mixture (M) is particularly advantageous as process aid for the fluoroelastomer (A) as it is provided advantageously as non-sticky material, which can be easily handled and incorporated in said fluoroelastomer (A). In particular, pre-mixing polymer (F) and (per)fluoropolyether (E) enables significant improvement in handling of this latter component, as (per)fluoropolyether (E) is generally available under the form of viscous liquid or low melting wax, which forms are typically difficult to handle, to meter and to incorporate in fluoroelastomer (A) in standard gums mixing devices.

Also, incorporation of powdery mixture (M) in the fluoroelastomer (A) has been shown to further improve mould release behaviour with respect to the separate addition of the two components.

Typically, the powdery mixture (M) comprises (per)fluoropolyether (E) in an amount of advantageously from 1 to 70% wt, preferably from 3 to 50% wt, more preferably from 5 to 25% wt.

Above mentioned composition boundaries enable obtaining powdery mixture (M) having improved free-flowing properties.

The powdery mixture (M) possesses an apparent density of advantageously from 0.1 to 1.3 g/cc, preferably between 0.4 to 1.0 g/cc.

The powdery mixture (M) is another object of the present invention.

When the fluoroelastomer composition further comprises a polymer (T), said polymer (T) is generally admixed under the form of a latex with a latex of fluoroelastomer (A) in the required weight ratios; then the mixture is co-coagulated as described in U.S. Pat. No. 6,395,834 and U.S. Pat. No. 6,310,142 and further mixed with polymer (F) and, optionally (per)fluoropolyether (E).

Alternatively, the fluoroelastomer (A) can be manufactured by seed-polymerization in the presence of a latex of polymer (T), so as to obtain a core-shell structure comprising a core of polymer (T) and a shell of fluoroelastomer (A), which can be then further mixed with polymer (F) and, optionally, (per)fluoropolyether (E).

The invention finally pertains to cured articles obtained from the fluoroelastomer compositions of the invention. Articles are notably obtained by means of ionic curing, peroxide curing and/or mixed curing from the fluoroelastomer compositions of the invention.

When the fluoroelastomer compositions the present invention are cured by peroxide route, fluoroelastomer (A) preferably contains iodine and/or bromine atoms in the chain and/or at the end of the macromolecules. The introduction of these iodine and/or bromine atoms may be obtained:

by addition during fluoroelastomer (A) manufacture to the polymerization medium of brominated and/or iodinated cure-site comonomers, such as bromo and/or iodo olefins containing from 2 to 10 carbon atoms (as described, for example, in U.S. Pat. No. 4,035,565 and U.S. Pat. No. 4,694,045), or iodo and/or bromo fluoroalkyl vinyl ethers (as described in U.S. Pat. No. 4,745,165, U.S. Pat. No. 4,564,662 and EP 199 138), in amounts such that the content of cure-site comonomers in the fluoroelastomer (A) is generally between 0.05 and 2 mol per 100 mol of the other base monomer units; or via addition during fluoroelastomer (A) manufacture of iodinated and/or brominated chain-transfer agent(s) to the polymerization medium, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 and U.S. Pat. No. 4,943,622) or alkali metal or alkaline-earth metal iodides and/or bromides, as described in U.S. Pat. No. 5,173,553.

The peroxide curing is performed according to known techniques via addition of a suitable peroxide that is capable of generating radicals by thermal decomposition. Among most commonly used agents, mention can be made of: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other suitable peroxide systems are those described, notably, in patent applications EP 136 596 and EP 410 351.

Other ingredients generally added to the curable compound comprising the compositions of the invention, when curing via peroxidic route, are:

(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins, as notably described in European patent application EP 769 520; triazines described in European patent applications EP 860 436 and WO 97/05122; TAIC being particularly preferred;

(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc., as described in EP 708 797;

(d) other conventional additives, such as fillers, thickeners, pigments, antioxidants, stabilizers and the like.

When the fluoroelastomer (A) comprises recurring units comprising cyanide groups, the curing of the compositions thereof can be also performed using organotin compounds or biaromatic amine compounds as crosslinking agents, as notably described in U.S. Pat. No. 4,394,489, U.S. Pat. No. 5,767,204 and U.S. Pat. No. 5,789,509. This type of curing may be combined with peroxide-type curing, when the fluoroelastomer (A) also comprises iodine or bromine atoms, preferably in terminal positions, as described in patent U.S. Pat. No. 5,447,993.

The ionic curing can be performed via addition of curing agents and accelerators as well known in the art. The amounts of accelerators are between 0.05-5 phr and the curing agent between 0.5-15 phr and preferably 1-6 phr.

Aromatic or aliphatic polyhydroxylated compounds, or derivatives thereof, may be used as curing agents, as described, for example, in EP 335 705 and U.S. Pat. No. 4,233,427. Among these, mention will be made in particular of: dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, for example, EP 335 705 and U.S. Pat. No. 3,876,654); aminophosphonium salts (see, for example, U.S. Pat. No. 4,259,463); phosphoranes (see, for example, U.S. Pat. No. 3,752,787); the imine compounds described in EP 182 299 and EP 120 462; etc. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethylphosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position.

The preparation of the adduct is described in European patent application EP 684 277 in the name of the Applicant, which is included herein in its entirety by reference.

Other ingredients generally added to the curable compound comprising the compositions of the invention, when curing via ionic route are:
i) one or more mineral acid accelerators chosen from those known in the ionic curing of vinylidene fluoride copolymers, in amounts of 1-40 parts per 100 parts of fluoroelastomer copolymer;
ii) one or more basic compounds chosen from those known in the ionic curing of vinylidene fluoride copolymers, in amounts of from 0.5 to 10 parts per 100 parts of fluoroelastomer copolymer.

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the abovementioned metal salts; among the compounds of the type i), mention may be made of MgO.

The above mentioned amounts of the mixture are relative to 100 phr of fluoroelastomer (A).

Also, other conventional additives, such as fillers, thickeners, pigments, antioxidants, stabilizers and the like, may then be added to the curing mixture.

The fluoroelastomer compositions of the present invention may also be cured via a mixed route combining the two types of curing.

The present invention will be now described in more detail with reference to the following examples, whose purpose is merely illustrative and not limitative of the scope of the invention.

Raw Materials

TECNOFLON® FOR X8000 ZPC (A-1, herein below) is a cure incorporated VDF/HFP copolymer (VDF/HFP 78.5/21.5 mol/mol), comprising bisphenol AF and 1,1-dyphenyl-1-benzyl-N-diethylphosforanamine chloride, available from Solvay Solexis S.p.A.

TECNOFLON® FOR4391 (A-2, herein below) is a cure incorporated $VF_2$/HFP/TFE fluoroelastomer having a fluorine content of 70% wt, comprising bisphenol AF and 1,1-dyphenyl-1-benzyl-N-diethylphosforanamine chloride, commercially available from Solvay Solexis S.p.A.

MAGLITE® DE MgO is a magnesium oxide commercially available from CPH Solutions Corp.

RHENOFIT® CF is a commercially available $Ca(OH)_2$.

BLANC FIXE® $BaSO_4$ is a commercial product from Solvay Bario e Derivati S.p.A.

TREMIN® 283 600 EST is a epoxisilane modified wollastonite commercially available.

FOMBLIN® Z-DOL PFPE (PFPE-1, herein below) is a perfluoropolyether complying with the following formula:

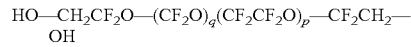

wherein p/q is about 1, p and q are such that the number averaged molecular weight is 2000, commercially available from Solvay Solexis S.p.A.

FLUOROLINK® A-10 PFPE (PFPE-2, herein below) is a perfluoropolyether complying with the following formula:

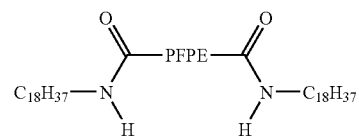

wherein PFPE represents a $—CF_2O—(CF_2O)_q(CF_2CF_2O)_p—CF_2—$ chain, wherein p/q is about 1, p and q are such that the number averaged molecular weight is about 1800, commercially available from Solvay Solexis S.p.A.

HYFLON® MFA 982 (MFA, herein below) is a MVE/TFE copolymer (2/98 mol/mol) commercially available from Solvay Solexis S.p.A., having a melting point of 305-309° C.

Mechanical and Sealing Property Determination on Cured Samples

13×13×2 mm plaques and O-rings (size class=214) have been cured in a pressed mould and then post-treated in an air circulating oven in conditions (time, temperature) specified in the Examples.

The tensile properties have been determined on specimens punched out from the plaques, according to the ASTM D 412 method, method C.

M100% is the tensile strength in MPa at an elongation of 100%

T.S. is the tensile strength in MPa;

E.B. is the elongation at break in %.

The Shore A hardness (3") has been determined on 3 pieces of plaque piled according to the ASTM D 2240 method.

The compression set has been determined on O-ring (class: 214), according to the ASTM D 329 method.

EXAMPLE 1

Example 1a

Preparation of a Per(halo)fluoropolymer (Polymer F-1)

A 22 l AISI 316 autoclave equipped with a stirrer working at 500 rpm was evacuated and 14.5 l of demineralized water and 127 g of a microemulsion formed of 20% by weight of GALDEN® D02, having the formula: $CF_3O-(CF_2CF(CF_3)O)_m(CF_2O)_n-CF_3$, where m/n=20 and average molecular weight of 450; 30% by weight of a surfactant having the formula: $Cl-(C_3F_6O)-(CF_2CF(CF_3)O)_{m1}-(CF(CF_3)O)_q-(CF_2O)_{n1}-CF_2COO^-NH_4^+$, where n1=1.0% m1, q=9.1% m1 and average molecular weight of 550; the remaining part being formed by $H_2O$, were introduced in said autoclave.

The autoclave was evacuated and then heated to the reaction temperature of 75° C. Then ethane was charged as chain transfer agent with a delta pressure of 2.0 bar, perfluoromethylvinylether (MVE) was charged with a delta pressure of 6.3 bar, and afterwards a tetrafluoroethylene (TFE)/MVE mixture containing 13% by moles of MVE was fed to achieve the reaction pressure set point of 21 absolute Bar. The polymerization was initiated by introducing 315 ml of an ammonium persulfate (APS) solution, obtained by dissolving 14.5 g APS in 1 liter of demineralized water. The reaction pressure was kept constant by feeding the monomer mixture TFE/MVE containing 13% by moles of MVE above described. After 290 minutes of reaction, the polymerization was stopped, the reactor was cooled down to room temperature and the residual pressure was released. A latex containing 329 (g polymer)/(kg latex) was discharged and coagulated with $HNO_3$; the polymer was then separated, washed with demineralized water and dried in an oven at 120° C. for about 16 hours. The so-obtained powder was found to have a dynamic viscosity of 5 Pa×s at 280° C. and at a shear rate of 1 rad× $sec^{-1}$, a $T_{m2}$ of 205.9° C., a $\Delta H_{2f}$=6.279 J/g, a $T_g$ of 40.6° C. and was found to be composed of 13% by moles of MVE and 87% by moles of TFE.

Example 1b

Blending of a Fluoroelastomer with the Per(halo)fluoropolymer

TECNOFLON® FOR X8000 ZPC was compounded with 3 phr of the powder obtained as detailed hereinabove (polymer F-1), and other ingredients as detailed in Table 2 here below.

So obtained composition was tested for its Mooney viscosity and mechanical and sealing properties after curing at 200° C. for 4 minutes and post-curing at 250° C. for 2 hours. Results are summarized in Table 2.

Example 1c

Injection Moulding Testing

Curable composition from ex. 1b) was processed in a RUTIL TECHNOSTAR® 90/12 vertical injection moulding machine using an O-ring AS568A-014 mould, having central injection point, equipped with 6 runners and cluster configuration for 54 dies.

Mould release and mould fouling properties in processing conditions were evaluated as above described. Results are summarized in Table 2.

EXAMPLE 2

Example 2a

The polymer obtained as detailed in example 1a) (polymer F-1) was dry mixed with FOMBLIN® Z-DOL (PFPE-1) in a high intensity blender and melt extruded in a Braebender® conical twin-screw Hastelloy C-276 extruder having a final diameter of 18 mm, with a temperature profile from 180 to 200° C. Stands obtained were cut in pellets and said latter were ground in a FRITCH pulverisette 14 rotor mill so as to obtain a free-flowing powdery mixture (F-1/PFPE-1 88/12 wt/wt) having the particle size distribution by sieving as sketched in table 1 here below and an apparent density of 0.844 g/cc.

TABLE 1

| Sieve openings | Weight fraction | Cumulative weight fraction |
|---|---|---|
| 850 | 6.09 | 6.1 |
| 600 | 19.77 | 25.9 |
| 425 | 23.61 | 49.5 |
| residue | 50.52 | 100.00 |

Example 2b) and c

Same procedure as detailed in example 1 b) and c) was repeated but the powdery mixture of example 2a) was used instead of the powder of polymer F-1 from example 1a). Results are summarized in Table 2.

EXAMPLE 3

Comparative

Same procedure as detailed in example 1 b) and c) was repeated, but no per(halo)fluoropolymer was used, so that a fluoroelastomer composition free from per(halo)fluoropolymer was obtained, cured and processed. Results are detailed in Table 2.

EXAMPLE 4

Comparative

Same procedure as detailed in example 1 b) and c) was repeated, but using HYFLON® MFA 982 instead of polymer F-1 from example 1a). Results are detailed in Table 2.

EXAMPLE 5

Comparative

Same procedure as detailed in example 1b) and c) was repeated, but the fluoroelastomer was compounded with a traditional process aid package including PFPE-2 and Carnauba wax, with no addition of per(halo)fluoropolymer. Results are detailed in Table 3.

EXAMPLE 6

Similar procedure of example 2 was repeated, but compounding the fluoroelastomer A-1 with 2.55 phr of polymer F-1 from example 1a) and 0.45 phr of PFPE-1, rather than with a pre-formed powdery mixture of F-1 and PFPE-1. Results are detailed in Table 3.

EXAMPLE 7

Same procedure of example 1 was repeated, but using 13 phr of polymer F-1 from example 1a). Results are detailed in Table 3.

EXAMPLE 8

Same procedure of example 2 was repeated, preparing a powdery mixture as in example 2a) but having following composition: F-1/PFPE-1 80/20 wt/wt. Results are detailed in Table 3

TABLE 2

| | | Ex. 1 | Ex. 2 | Ex. 3c | Ex. 4c |
|---|---|---|---|---|---|
| Processing aid formulation[§] | | | | | |
| A-1 | wt parts | 100 | 100 | 100 | 100 |
| F-1 | wt parts | 3 | 2.64[#] | — | — |
| PFPE-1 | wt parts | — | 0.36[#] | — | — |
| wax | wt parts | — | — | — | — |
| PFPE-2 | wt parts | — | — | — | — |
| MFA | wt parts | — | — | — | 3 |
| Moulding/curing: 4 min @ 200° C. and post-cure: 2 h @ 250° C. Mechanical properties on post-cured plaques | | | | | |
| T.S. | MPa | 11.8 | 12.2 | 12.4 | |
| M 100 | MPa | 6.1 | 7.5 | 6.4 | |
| E.B. | % | 171 | 163 | 170 | |
| HDS | Shore A | 72 | 72 | 71 | |
| Compression set after post-cure 70 h @ 200° C. on class 214 O-ring | | | | | |
| C-SET | % | 10 | 9 | 10 | 13 |
| Injection moulding processing test | | | | | |
| $T_{mould}$ | ° C. | 220 | 220 | 220 | 220 |
| $T_{screw}$ | ° C. | 90 | 90 | 90 | 90 |
| $T_{cure}$ | s | 75 | 65 | 65 | 80 |
| Flow-ability | a.u.[□] | 3 | 3 | 2 | 4 |
| Mould release | a.u.[□] | 3 | 4 | 1 | 2 |
| Mould fouling | a.u.[□] | 4 | 4 | 1 | 2 |

[§]100 parts of fluoroelastomer F-1 were formulated with 3.0 phr of MAGLITE MgO, 2.0 phr of Ca(OH)$_2$, 40 phr of TREMIN ® 283 600 EST, 20 phr of BLANC FIXE ® and 2 phr of Cr$_2$O$_3$; processing aids as detailed in Table were further compounded to this base formulation.
[□]a.u. = arbitrary units: 1 (very poor); 2 (poor); 3 (good); 4 (very good); 5 (excellent).
[#]F-1 and PFPE-1 added under the form of powdered mixture from example 2a).

TABLE 3

| | | Ex. 5c | Ex. 6 | Ex. 7 | Ex. 8 |
|---|---|---|---|---|---|
| Processing aid formulation[§] | | | | | |
| A-1 | wt parts | 100 | 100 | 100 | 100 |
| F-1 | wt parts | — | 2.55 | 13 | 2.40[#] |
| PFPE-1 | wt parts | — | 0.45 | — | 0.60[#] |
| wax | wt parts | 0.5 | — | — | — |
| PFPE-2 | wt parts | 1 | — | — | — |
| MFA | wt parts | — | — | — | — |
| Moulding/curing: 4 min @ 200° C. and post-cure: 2 h @ 250° C. Mechanical properties on post-cured plaques | | | | | |
| T.S. | MPa | 12.5 | 12.0 | 12.7 | 12.3 |
| M 100 | MPa | 8.6 | 7.4 | 6.4 | 7.3 |
| E.B. | % | 167 | 162 | 170 | 167 |
| HDS | Shore A | 72 | 72 | 76 | 71 |
| Compression set after post-cure 70 h @ 200° C. on class 214 O-ring | | | | | |
| C-SET | % | 14 | 12 | 15 | 10 |
| Injection moulding processing test | | | | | |
| $T_{mould}$ | ° C. | 220 | 220 | 220 | 220 |
| $T_{screw}$ | ° C. | 90 | 90 | 90 | 90 |
| $T_{cure}$ | s | 50 | 75 | 75 | 70 |
| Flow-ability | a.u.[□] | 4 | 4 | 4 | 4 |
| Mould release | a.u.[□] | 1 | 3 | 5 | 4 |
| Mould fouling | a.u.[□] | 2 | 5 | 5 | 5 |

[§]100 parts of fluoroelastomer F-1 were formulated with 3.0 phr of MAGLITE ® MgO, 2.0 phr of Ca(OH)$_2$, 40 phr of TREMIN ® 283 600 EST, 20 phr of BLANC FIXE ® and 2 phr of Cr$_2$O$_3$; processing aids as detailed in Table were further compounded to this base formulation.
[□]a.u. = arbitrary units: 1 (very poor); 2 (poor); 3 (good); 4 (very good); 5 (excellent).
[#]F-1 and PFPE-1 added under the form of powdered mixture (80/20 wt/wt).

Data of Table 2 and 3 have surprisingly shown, inter alia, that the addition of the mixture of polymer (F) and (per) fluoropolyether (E) under the form of powdery mixture (M) is particularly advantageous, as mould release is further improved (Ex. 2 and 8 vs. Ex. 6), with substantially no change in sealing properties (Cset); it should be understood that an improvement in mould release from 3 (good) to 4 (very good) is of significant importance, as corresponding improvement in processing throughput is highly valuable.

EXAMPLE 9

Similar procedure of example 1b) was repeated, but using fluoroelastomer A-2 instead of fluoroelastomer A-1.

100 parts of fluoroelastomer A-2 were compounded with 3.0 phr of MAGLITE® MgO, 6.0 phr of Ca(OH)$_2$, 40 phr of TREMIN® 283 600 EST, 20 phr of BLANC FIXE® and 2 phr of Cr$_2$O$_3$ and with 3 phr of polymer F-1.

So obtained composition was tested for its Mooney viscosity and mechanical and sealing properties after curing at 170° C. for 5 minutes and post-curing at 250° C. for (8+16) hours.

Results are summarized herein after in Table 4:

TABLE 4

| | | Ex. 9 |
|---|---|---|
| Moulding/curing: 5 min @ 170° C. and post-cure: (8 + 16 h) @ 250° C. | | |
| Mechanical properties on post-cured plaques | | |
| T.S. | MPa | 13.5 |
| M 100 | MPa | 6.2 |
| E.B. | % | 169 |
| HDS | Shore A | 76 |
| Compression set after post-cure 70 h @ 200° C. on class 214 O-ring | | |
| $C_{set}$ | % | 32 |
| Injection moulding processing test | | |
| $T_{mould}$ | ° C. | 190 |
| $T_{screw}$ | ° C. | 80 |
| $T_{cure}$ | s | 70 |
| Flow-ability | a.u.[□] | 5 |
| Mould release | a.u.[□] | 3 |
| Mould fouling | a.u.[□] | 4 |

[□]a.u. = arbitrary units: 1 (very poor); 2 (poor); 3 (good); 4 (very good); 5 (excellent).

The invention claimed is:

1. A fluoroelastomer composition comprising:
at least one fluoroelastomer;
from 0.1 to 25 phr (with respect to fluoroelastomer (A)) of at least one melt-processable per(halo)fluoropolymer having a melting point of at most 250° C. [polymer (F)]; and
optionally at least one (per)fluoropolyether [(perfluoropolyether (E)],
wherein the polymer (F) is selected among TFE copolymers comprising recurring units derived from at least one perfluoroalkylvinylether (PAVE) of formula $CF_2=CFOR_{f1'}$, in which $R_{f1'}$ is a $C_1$-$C_6$ perfluoroalkyl.

2. The fluoroelastomer composition of claim 1, wherein the fluoroelastomer (A) is selected from the group consisting of:
(1) vinylidene fluoride (VDF)-based copolymers, in which VDF is copolymerized with at least one comonomer chosen from the followings classes:
(a) $C_2$-$C_8$ perfluoroolefins;
(b) hydrogen-containing $C_2$-$C_8$ olefins;
(c) $C_2$-$C_8$ chloro and/or bromo and/or iodo-fluoroolefins;
(d) (per)fluoroalkylvinylethers (PAVE) of formula $CF_2=CFOR^f$, wherein $R_f$ is a $C_1$-$C_6$ (per)fluoroalkyl group;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms;
(f) (per)fluorodioxoles having formula:

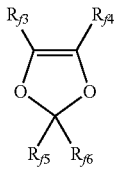

wherein $R_{f3}$, $R_{f4}$, $R_{f5}$, $R_{f6}$, equal to or different from each other, are independently selected from the group consisting of fluorine atoms and $C_1$-$C_6$ (per)fluoroalkyl groups, optionally comprising one or more than one oxygen atoms;
(g) (per)fluoro-metoxy-vinylethers (MOVE, hereinafter) having formula:

$$CFX_2=CX_2OCF_2OR''_f$$

wherein $R''_f$ is selected from the group consisting of $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2=F, H$; and $R''_f$ is $-CF_2CF_3$ (MOVE1); $-CF_2CF_2OCF_3$ (MOVE2); or $-CF_3$ (MOVE3); or
(h) $C_2$-$C_8$ non-fluorinated olefins (Ol); and
(2) TFE-based copolymers, in which TFE is copolymerized with at least one comonomer selected from the group consisting of classes (c), (d), (e), (g) (h) as above detailed, and the following class (i):
(i) perfluorovinyl ethers containing cyanide groups.

3. The fluoroelastomer composition of claim 2, wherein the fluoroelastomer (A) has one of the following compositions (in mol %) selected from the group consisting of:
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;
(ii) vinylidene fluoride (VDF) 50-80%, perfluoroalkyl vinyl ethers (PAVE) 5-50%, tetrafluoroethylene (TFE) 0-20%;
(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%;
(iv) tetrafluoroethylene (TFE) 50-80%, perfluoroalkyl vinyl ethers (PAVE) 20-50%;
(v) tetrafluoroethylene (TFE) 45-65%, $C_2$-$C_8$ non-fluorinated olefins (Ol) 20-55%, vinylidene fluoride 0-30%;
(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%;
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%; and
(ix) tetrafluoroethylene (TFE) 20-70%, fluorovinyl ethers (MOVE) 30-80%, perfluoroalkyl vinyl ethers (PAVE) 0-50%.

4. The fluoroelastomer composition of claim 1, wherein the polymer (F) is a TFE/perfluoromethylvinylether (MVE) copolymer consisting essentially of:
from 3 to 25% by moles by moles of recurring units derived from MVE; and
from 97 to 75% by moles of recurring units derived from TFE.

5. The fluoroelastomer composition according to claim 1, said composition comprising from 0.02 to 7 phr of (per)fluoropolyether (E).

6. The fluoroelastomer composition according to claim 5, wherein the (per)fluoropolyether (E) is selected from the group consisting of:
(a) $HO-CH_2CF_2O(CF_2O)_{n'}(CF_2CF_2O)_{m'}CF_2CH_2-OH$, m' and n' being integers, where the ratio m'/n' generally ranges between 0.1 and 10;
(b) $HO(CH_2CH_2O)_nCH_2CF_2O(CF_2O)_{n'}(CF_2CF_2O)_{m'}CF_2CH_2(OCH_2CH_2)_nOH$, m' and n' being integers, where the ratio m'/n' ranges between 0.1 and 10, and n ranges between 1 and 3;
(c) $HCF_2O(CF_2O)_{n'}(CF_2CF_2O)_{m'}CF_2H$, m' and n' being integers, where the ratio m'/n' ranges between 0.1 and 10;
(d) $FCF_2O(CF_2O)_{n'}(CF_2CF_2O)_{m'}CF_2F$, m' and n' being integers, where the ratio m'/n' ranges between 0.1 and 10.

7. The fluoroelastomer composition according to claim 1, further comprising an additional semicrystalline (per)fluoropolymer different from polymer (F), in an amount from 0 to 70 phr with respect to the fluoroelastomer (A), said polymer (T) being selected from the group consisting of:
tetrafluoroethylene (TFE) homopolymer and TFE copolymers with one or more monomers comprising at least one unsaturation of ethylene type, in an amount from 0.01% to 10% by moles, said TFE homopolymer and copolymers having a melting point higher than 250° C.; and
vinylidene fluoride (VDF) homopolymer and VDF copolymers with one or more monomers comprising at least one unsaturation of ethylene type, in an amount from 0.01% to 30% by moles.

8. A process for manufacturing the fluoroelastomer composition according to claim 1, said process comprising incorporating into the fluoroelastomer (A) the required amount of the polymer (F), and optionally of the (per)fluoropolyether (E).

9. The process of claim 8 for manufacturing the fluoroelastomer composition comprising the (per)fluoropolyether (E), said process comprising first mixing the polymer (F) and the (per)fluoroether (E) so as to obtain a process aid mixture, and then incorporating said mixture (M) into the fluoroelastomer (A).

10. The process of claim 9, wherein the polymer (F) and the (per)fluoropolyether (E) are admixed by melt compounding to obtain a molten mixture (M), wherein the molten mixture (M) is cooled so as to obtain a solid mixture (M) under the form of pellets or slabs, and wherein said solid mixture (M) is milled or ground so as to obtain a powdery mixture (M) comprising polymer (F) and (per)fluoropolyether (E).

11. A powdery mixture (M) comprising a polymer (F) and a (per)fluoropolyether (E) obtained by admixing the polymer (F) and the (per)fluoropolyether (E) by melt compounding to obtain a molten mixture (M), cooling the molten mixture (M) so as to obtain a solid mixture (M) under the form of pellets or slabs, and milling or grinding said solid mixture (M), wherein the polymer (F) is selected among TFE copolymers comprising recurring units derived from at least one perfluoroalkylvinylether (PAVE) of formula $CF_2=CFOR_{f1'}$, in which $R_{f1'}$ is a $C_1$-$C_6$ perfluoroalkyl.

12. The powdery mixture (M) of claim 11, said mixture possessing an apparent density of from 0.1 to 1.3 g/cc.

13. Cured articles obtained from the fluoroelastomer composition according to claim 1.

* * * * *